J. C. CLIFFORD.
SWIVELS.

No. 183,750. Patented Oct. 31, 1876.

Witnesses:
William Howard
Eugene Bandel

Inventor:
J. C. Clifford

UNITED STATES PATENT OFFICE.

JOSEPH C. CLIFFORD, OF UNITED STATES ARMY.

IMPROVEMENT IN SWIVELS.

Specification forming part of Letters Patent No. 183,750, dated October 31, 1876; application filed August 14, 1876.

*To all whom it may concern:*

Be it known that I, JOSEPH C. CLIFFORD, of Ordnance Corps, United States Army, have invented an Attachment for Swivels, of which the following is a specification:

The object of my invention is to reduce friction in swivels by the insertion of hardened balls $b$ between the bearing-surfaces of the grooved annular disks $a$ and $a'$.

Figure 1:
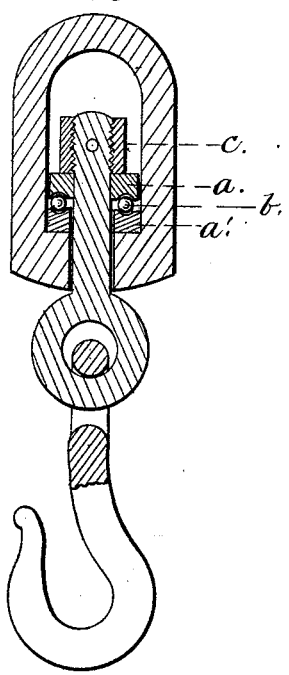
Figure 3:
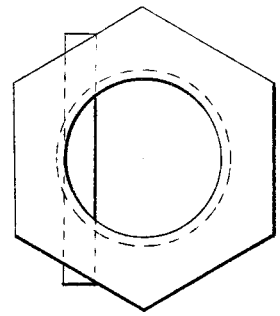
Figure 4:
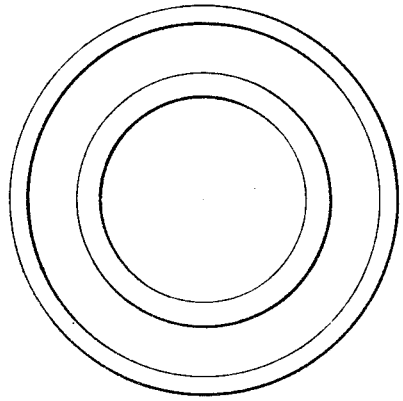
Figure 2:
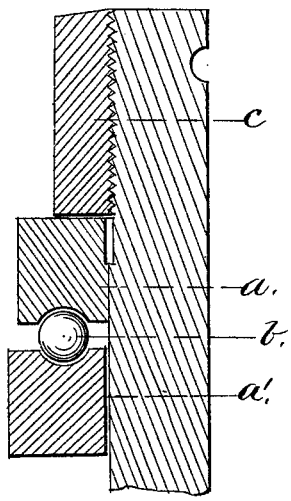
Figure 5:
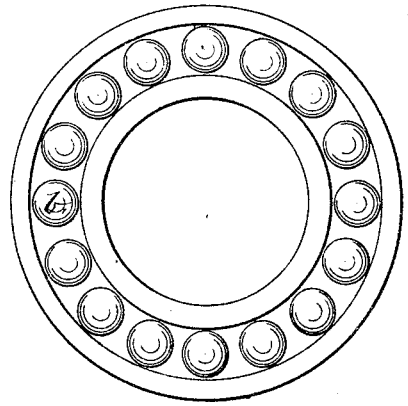

Figure 1 is intended to represent a sectional view; Fig. 2, a section of one-half; Fig. 3, a plan of the nut; Fig. 4, plan of lower surface of upper disk; and Fig. 5, plan of upper surface of lower disk.

The construction and mode of operation of this device may be described as follows:

First grooved disk: An annular metallic disk or hollow cylinder, the inner diameter of which is about one-half ($\frac{1}{2}$) the outer, and the height equal to the difference of semi-diameters, rests upon a fixed support, or in an iron loop, which is suspended from a fixed support. The upper base, which lies in a horizontal plane, has a groove cut in it about equally distant from the inner and the outer cylindrical surfaces of the disk. The cross-section of this groove is a segment of a circle, whose radius is about four one-hundredths greater than the radius of one of the balls that are to work in the groove. The depth of the groove is about four-tenths its radius.

Balls: In this groove are balls of uniform diameter and hardness, and made as nearly spherical as possible.

Second grooved disk: Upon this circle of balls rests a second disk, like the first in outer diameter and thickness, but having the groove cut in its lower base. It will be seen, then, that the balls work in two grooves, and that the disks are separated from each other by about one-fourth ($\frac{1}{4}$) the diameter of one of the balls.

To insure the successful operation of this device it is necessary that the balls and grooved disks should be finished with great care.

In a swivel capable of sustaining a weight of more than thirty thousand pounds, both disks and balls were made of cast-steel and hard-tempered.

Dimensions: Exterior diameter of disks, 2.9 inches; interior diameter of disks, 1.375 inches; height of disks, .75 inch; number of balls, 15; diameter of balls, 0.375 inch.

Suspension-rod: The upper disk is fastened to a rod, the axis of which forms a right angle with the base of the disk. Through the lower disk the rod passes freely. Upon this rod, below the lower disk and its support, hangs the weight that is to be rotated on a vertical axis. This weight may be the drill and rods in an artesian well, a turbine wheel, or any other weight that it may not be practicable to support from below.

I claim—

As an improved article, a swiveled hook or rod, provided with the grooved annular disks $a\ a'$ and balls $b$, substantially as shown and described, and for the purpose specified.

J. C. CLIFFORD.

Witnesses:
WILLIAM HOWARD,
EUGENE BANDEL.